(12) United States Patent
Chen et al.

(10) Patent No.: US 12,243,159 B2
(45) Date of Patent: Mar. 4, 2025

(54) DIGITAL TWIN MODELING METHOD AND SYSTEM FOR ASSEMBLING A ROBOTIC TELEOPERATION ENVIRONMENT

(71) Applicants: Qingdao University of Technology, Shandong (CN); Shandong University, Jinan Shandong (CN); Hebei University of Technology, Tianjin (CN)

(72) Inventors: Chengjun Chen, Shandong (CN); Zhengxu Zhao, Shandong (CN); Tianliang Hu, Shandong (CN); Jianhua Zhang, Shandong (CN); Yang Guo, Shandong (CN); Dongnian Li, Shandong (CN); Qinghai Zhang, Shandong (CN); Yuanlin Guan, Shandong (CN)

(73) Assignees: QINGDAO UNIVERSITY OF TECHNOLOGY, Shandong (CN); SHANDONG UNIVERSITY, Jinan Shandong (CN); EBEI UNIVERSITY OF TECHNOLOGY, Tianjin (CN)

( * ) Notice: Subject to any disclaimer, the term of this patent is extended or adjusted under 35 U.S.C. 154(b) by 415 days.

(21) Appl. No.: 17/893,368

(22) Filed: Aug. 23, 2022

(65) Prior Publication Data

US 2023/0230312 A1 Jul. 20, 2023

(51) Int. Cl.
*G06T 17/00* (2006.01)
*B25J 9/16* (2006.01)
(Continued)

(52) U.S. Cl.
CPC ............. *G06T 17/00* (2013.01); *B25J 9/1605* (2013.01); *B25J 9/1687* (2013.01); *B25J 9/1689* (2013.01);
(Continued)

(58) Field of Classification Search
CPC ....... G06T 17/00; G06T 7/0004; G06T 7/194; G06T 7/50; G06T 7/70; G06T 19/70;
(Continued)

(56) References Cited

U.S. PATENT DOCUMENTS

| | | | |
|---|---|---|---|
| 2015/0063627 A1* | 3/2015 | Mohammad .......... | G06T 7/0004 382/103 |
| 2020/0024849 A1* | 1/2020 | Blumer ................... | G06F 30/13 |

(Continued)

*Primary Examiner* — Khoi H Tran
*Assistant Examiner* — Tristan J Greiner
(74) *Attorney, Agent, or Firm* — McClure, Qualey & Rodack, LLP

(57) ABSTRACT

A digital twin modeling method to assemble a robotic teleoperation environment, including: capturing images of the teleoperation environment; identifying a part being assembled; querying the assembly assembling order to obtain a list of assembled parts according to the part being assembled; generating a three-dimensional model of the current assembly from the list and calculating position pose information of the current assembly in an image acquisition device coordinate system; loading a three-dimensional model of the robot, determining a coordinate transformation relationship between a robot coordinate system and an image acquisition device coordinate system; determining position pose information of the robot in an image acquisition device coordinate system from the coordinate transformation relationship; determining a relative positional relationship between the current assembly and the robot from position pose information of the current assembly and the robot in an image acquisition device coordinate system; establishing a digital twin model of the teleoperation environment.

10 Claims, 2 Drawing Sheets

(51) Int. Cl.
*B25J 13/08* (2006.01)
*G06T 7/00* (2017.01)
*G06T 7/194* (2017.01)
*G06T 7/50* (2017.01)
*G06T 7/70* (2017.01)
*G06T 19/20* (2011.01)
*H04N 13/20* (2018.01)
*H04N 23/10* (2023.01)

(52) U.S. Cl.
CPC .............. *B25J 9/1697* (2013.01); *B25J 13/08* (2013.01); *G06T 7/0004* (2013.01); *G06T 7/194* (2017.01); *G06T 7/50* (2017.01); *G06T 7/70* (2017.01); *G06T 19/20* (2013.01); *H04N 13/20* (2018.05); *H04N 23/10* (2023.01); *G06T 2207/10024* (2013.01); *G06T 2207/10028* (2013.01); *G06T 2207/20081* (2013.01); *G06T 2207/30164* (2013.01); *G06T 2207/30204* (2013.01); *G06T 2219/2004* (2013.01)

(58) Field of Classification Search
CPC ........... G06T 19/20; G06T 2207/10024; G06T 2207/10028; B25J 9/1605; B25J 9/1687; B25J 9/1689; B25J 9/1697; B25J 13/08; H04N 13/20; H04N 23/10
See application file for complete search history.

(56) References Cited

U.S. PATENT DOCUMENTS

| | | | |
|---|---|---|---|
| 2020/0078948 A1* | 3/2020 | Krause | G06F 3/0346 |
| 2022/0100917 A1* | 3/2022 | McGregor | G06T 13/20 |
| 2022/0147026 A1* | 5/2022 | Poelman | B25J 9/1653 |

* cited by examiner

DIGITAL TWIN MODELING METHOD AND SYSTEM FOR ASSEMBLING A ROBOTIC TELEOPERATION ENVIRONMENT

FIELD OF THE INVENTION

The present invention relates to a digital twin modeling method and system to assemble a robotic teleoperation environment, which relates to the technical field of intelligent manufacturing and digital twin modeling.

BACKGROUND OF THE INVENTION

In assembly robot teleoperation, an operator at the local end needs to maneuver a robot at the remote end for assembly tasks, the teleoperation environment at the remote end of the assembly robot mainly including elements such as the robot and the assembly, and the geometric model of the robot and the assembly, their position pose need to be precisely measured, so the remote environment is a dynamically changing environment.

To build a digital twin model of one remote teleoperation environment on the local computer, three-dimensional models of the assembly and robot need to be built dynamically according to the assembly process. Consistent geometric modeling is the key to guaranteeing that the twin model is consistent with the teleoperation environment.

Conventional modeling methods are typically vision-based reconstruction methods, specifically computer technology to recover three-dimensional information using two-dimensional projections, the result of the reconstruction is typically a model of point clouds, meshes, voxels, etc. that is not enabling segmentation of parts due to lacking semantics, and that is difficult to achieve global reconstruction due to existing problems with occlusions.

SUMMARY OF THE INVENTION

In order to solve the problems present in the prior art described above, the present invention provides a digital twin modeling method of assembly robot teleoperation environment, by positioning the assembly and robot, determining positional relationships between the assembly and robot, avoiding vision-based dense reconstruction, improving accuracy and visualization of three-dimensional models.

The technical solutions of the present invention are as follows:

one aspect of the invention provides a digital twin modeling method of assembling a robotic teleoperation environment, including the steps of:
capturing, by an image acquisition device, an image of a teleoperation environment;
identifying a part currently being assembled in the image;
querying the assembly assembling order to obtain a list of assembled parts according to the part currently being assembled;
generating a three-dimensional model of the current assembly from the list of assembled parts and calculating position pose information of the current assembly in an image acquisition device coordinate system;
loading a three-dimensional model of the robot, determining a coordinate transformation relationship between a robot coordinate system and an image acquisition device coordinate system;
position calibrating the robot in the image according to the coordinate transformation relationship, and determining position pose information of the robot in an image acquisition device coordinate frame;
determining a relative positional relationship between the current assembly and the robot from the position pose information of the current assembly in the image acquisition device coordinate system and the position pose information of the robot in the image acquisition device coordinate system;
establishing a digital twin model of the teleoperation environment based on a three-dimensional model of the current assembly, a three-dimensional model of the robot, and a relative positional relationship between the current assembly and the robot.

As a preferred embodiment, the images captured by the image acquisition device include depth images, the step of the identifying parts currently being assembled in the images is specified by:
identifying regions of different parts of the assembly in the depth image using different color labels to generate an instance segmented image;
counting color labels of the example segmented images to identify the parts that are currently being assembled.

As a preferred embodiment, the step of the generating a three-dimensional model of the current assembly from the list of assembled parts is specified by:
loading the three-dimensional model of each part in the list of assembled parts;
determining positions of the parts on the assembly in the list according to predefined constraint relationships between the parts of the assembly;
generating the three-dimensional model of the current assembly by adjusting the position of the three-dimensional model of each part according to the position of each part in the assembly in the list.

As a preferred embodiment, the step of the calculating position pose information of the current assembly in an image acquisition device coordinate system is specified by:
pre-processing the depth image, removing background, preserving the depth image of the current assembly;
converting the depth image of the current assembly to an assembly point cloud with the intrinsic and imaging model of the image acquisition device;
inputting the assembly point cloud to a point cloud feature extraction network to extract point cloud features of the assembly;
inputting the point cloud features of the assembly to a pre-trained pose estimation network, outputting position pose information of the assembly in the image acquisition device coordinate system.

As a preferred embodiment, the pre-training of the pose estimation network is:
determining initial information; extracting and recording label position pose information of the three-dimensional model point cloud of the assembly at the initial perspective, the label position pose information comprising a rotation matrix $R_i$ and an offset matrix $T_i$, for each point in the three-dimensional model point cloud, i being an index for each point in the three-dimensional model point cloud;
point cloud conversion; extracting an assembly depth image of the 3D model of the assembly at another view angle different from the initial view angle and converting the assembly depth image into an assembly point cloud using the intrinsic and imaging model of the image acquisition device;

pose prediction; inputting the assembly point cloud to a point cloud feature extraction network, outputting point cloud point-wise features, inputting the point cloud point-wise features to a pose estimation network, predicting pose prediction information for each point comprising a predicted rotation matrix $R'_i$ and a predicted offset matrix $T'_i$;

calculating a Euclidean distance of the pose prediction information of each point from the label position pose information, generating confidence based on the Euclidean distance; performing the step of the image update if the confidence is less than a set threshold and outputting assembly optimal pose prediction information for the current view angle if the confidence is greater than the set threshold or the number of trains reaches a set value; determining whether training is complete, returning to the step of the point cloud conversion if not complete, continuing training by replacing the assembly depth image at the next view angle, and performing the step of the image update if complete;

an image update; performing displacement and rotation transformations on the assembly point cloud, using the predicted rotation matrix $R'_i$ and the predicted offset matrix $T'_i$ as inputs, updating the three-dimensional coordinates of the assembly point cloud, and inputting the updated assembly point cloud to the point cloud feature extraction network to continue training.

As a preferred embodiment, the image acquisition device is an RGB-D camera, the captured images further includes RGB images; the step of the determining a coordinate transformation relationship between the robot coordinate system and the image acquisition device coordinate system is specified by:

disposing a positioning marker at a joint of the robot;

controlling the robot to make point-position intermittent motions, at each point of intermittent motion, reading coordinates $P_i(x_{wi}, y_{wi}, z_{wi})$ of the positioning marker in the robot coordinate system by the robot controller while identifying pixel coordinates $Z_i(u_i, v_i)$ of the feature point of the positioning marker in the RGB image;

deriving three-dimensional coordinates $P'_i(x_{ci}, y_{ci}, z_{ci})$ of the positioning marker's feature point in the camera coordinate system using the positional relationship between the depth camera and the color camera in the RGB-D camera based on the pixel coordinates $Z_i(u_i, v_i)$ of the positioning marker's feature point in the RGB image and the imaging model of the RGB-D camera;

obtaining the coordinates $P_i(x_{wi}, y_{wi}, z_{wi})$ of the positioning marker in the robot coordinate system and the three-dimensional coordinates $P'_i(x_{ci}, y_{ci}, z_{ci})$ of the feature points of the positioning marker in the camera coordinate system of the four or more intermittent motion points, and calculating the transformation matrices of the robot coordinate system and the camera coordinate system.

As a preferred embodiment, in the step of controlling the robot to make the point-position intermittent motion, the trajectory of the set point-position intermittent motion is a plurality of squares.

Another aspect of the invention provides a digital twin modeling system of assembling a robotic teleoperation environment, including:

an image acquisition device, for capturing images of a teleoperational environment;

an assembly digitization module, pre-loaded with the three-dimensional mold of the parts in the assembly, the constraining relationships between the parts, and the assembly assembling order;

an assembly reconstruction module, for identifying the part currently being assembled in the image and query the assembly assembling order to obtain a list of assembled parts based on the part currently being assembled; and generating a three-dimensional model of the current assembly from the list of assembled parts;

an assembly positioning module, for calculating position pose information of a current assembly in an image acquisition device coordinate system;

a robot digitization module, preloaded with a three-dimensional model of the robot;

a robot positioning module, for determining a coordinate transformation relationship between a robot coordinate system and an image acquisition device coordinate system; and position calibrating the robot in the image according to the coordinate transformation relationship, determining position pose information of the robot in the image acquisition device coordinate system;

a digital twin model reconstruction module, for determining a relative positional relationship between the current assembly and the robot from position pose information of the current assembly in an image acquisition device coordinate system and position pose information of the robot in the image acquisition device coordinate system; and establishing a digital twin model of the teleoperation environment based on the three-dimensional model of the current assembly, the three-dimensional model of the robot, and a relative positional relationship between the current assembly and the robot.

As a preferred embodiment, the image acquisition device is an RGB-D camera.

The yet another aspect of the present invention provides an electronic device, including a memory, a processor, and a computer program stored in the memory and executable in the processor, characterized by the processor when executing the program to implement the digital twin modeling method of assembling a robot teleoperation environment as described in any of the embodiments of the present invention.

The present invention has the following advantageous effects:

the present invention relates to a digital twin modeling method of assembling a robotic teleoperation environment, by identifying parts being assembled, capturing a list of assembled parts with a pre-entered assembly assembling sequence, reconstructing a high precision three-dimensional model of a current assembly from the list of assembled parts. Position pose information of the assembly and the robot in the image acquisition device coordinate system is calculated to obtain relative positional relationships between the robot and the assembly, a digital twin model of an accurate teleoperation environment is established based on the above relationship.

DETAILED DESCRIPTION OF THE INVENTION

The technical solutions in embodiments of the present invention will now be clearly and fully described in conjunction with the accompanying drawings in embodiments of the present invention, and it will be apparent that the described embodiments are only some, but not all, embodiments of the present invention. Based on the embodiments of the present invention, all other embodiments obtained by a person of ordinary skill in the art without inventive affords are within the scope of protection of the present invention.

It is to be understood that the step numbering used herein is merely for convenience of description and is not intended as a limitation on the order in which the steps are performed.

It is to be understood that the terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise.

The terms "comprises," "comprising," "includes," and "including" indicate the presence of stated features, integers, steps, operations, elements, and/or components, but do not preclude the presence or addition of one or more other features, integers, steps, operations, elements, components, and/or groups thereof.

The term "and/or" refers to any and all possible combinations of one or more of the associated listed items and includes such combinations.

Example 1

Figure 1:
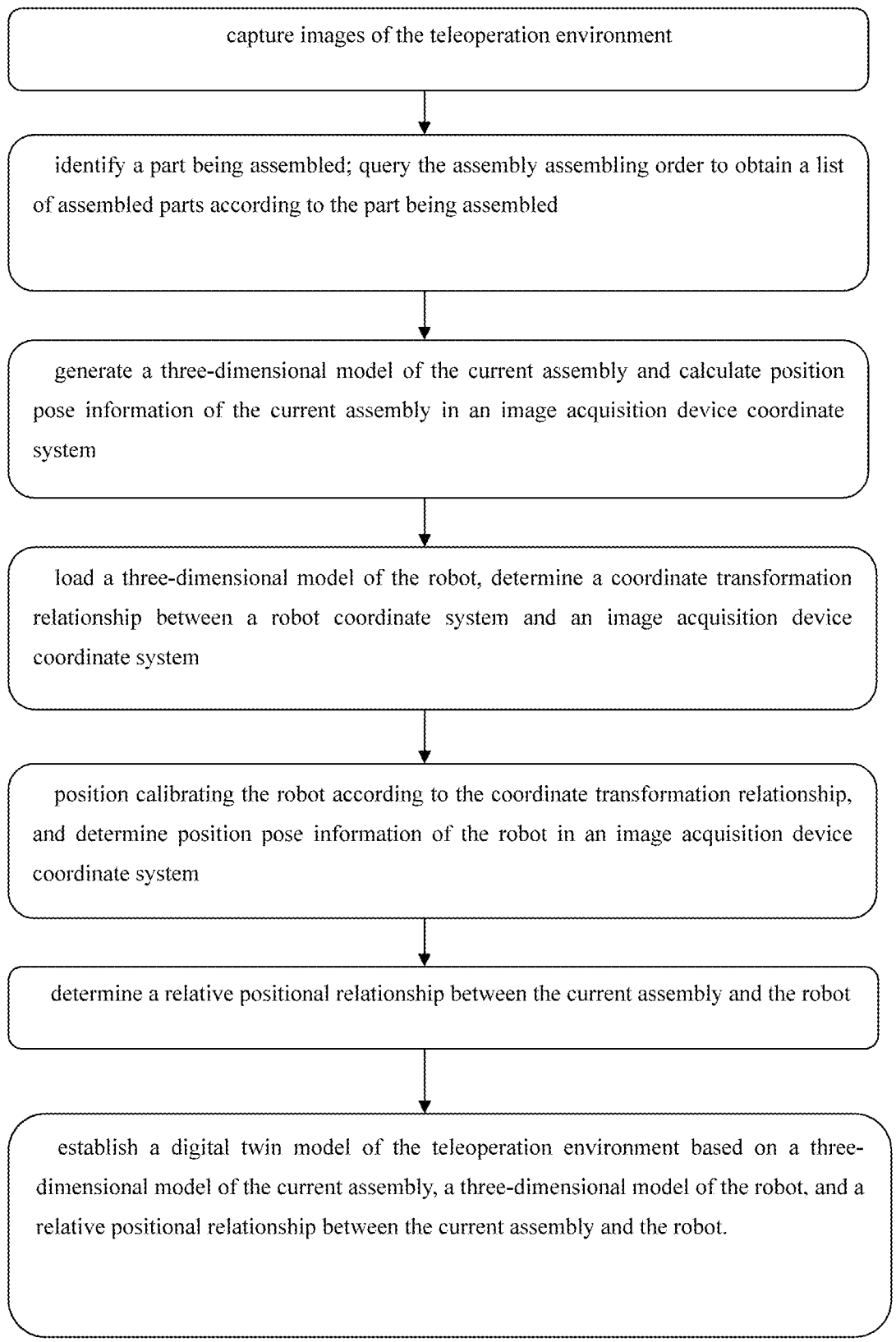
FIG. 1 is a flow diagram of an embodiment of the present invention.

Referring to FIG. 1, the present embodiment provides a digital twin modeling method of assembling a robotic teleoperation environment, including the steps of:
  capturing, by an image acquisition device, an image of a teleoperation environment;
  identifying a part currently being assembled in the image;
  querying the assembly assembling order to obtain a list of assembled parts according to the part currently being assembled;
  generating a three-dimensional model of the current assembly from the list of assembled parts and calculating position pose information of the current assembly in an image acquisition device coordinate system;
  loading a three-dimensional model of the robot, determining a coordinate transformation relationship between a robot coordinate system and an image acquisition device coordinate system;
  position calibrating the robot in the image according to the coordinate transformation relationship, and determining position pose information of the robot in an image acquisition device coordinate frame;
  determining a relative positional relationship between the current assembly and the robot from the position pose information of the current assembly in the image acquisition device coordinate system and the position pose information of the robot in the image acquisition device coordinate system;
  establishing a digital twin model of the teleoperation environment based on a three-dimensional model of the current assembly, a three-dimensional model of the robot, and a relative positional relationship between the current assembly and the robot.

The present embodiment reconstructs a high-precision three-dimensional model of the current assembly from the list of assembled parts by identifying the assembly parts being assembled, capturing a list of assembled parts using a pre-entered assembly sequence. Position pose information of the assembly and the robot in the image acquisition device coordinate system is calculated to obtain relative positional relationships between the robot and the assembly, establish a digital twin model of an accurate teleoperation environment based on this relationship.

As a preferred implementation of this embodiment, the images captured by the image acquisition device include depth images, the step of the identifying parts currently being assembled in the images is specified by:
  identifying regions of different parts of the assembly in the depth image using different color labels to generate an instance segmented image;
  counting color labels of the example segmented images to identify the parts that are currently being assembled.

As a preferred implementation of the present embodiment, the step of the generating a three-dimensional model of the current assembly from the list of assembled parts is specified by:
  loading the three-dimensional model of each part in the list of assembled parts;
  determining positions of the parts on the assembly in the list according to predefined constraint relationships between the parts of the assembly;
  generating the three-dimensional model of the current assembly by adjusting the position of the three-dimensional model of each part according to the position of each part in the assembly in the list.

As a preferred implementation of this embodiment,
the step of the calculating position pose information of the current assembly in an image acquisition device coordinate system is specified by:
  pre-processing the depth image, removing background, preserving only the current assembly, obtaining the depth image of the current assembly;
  converting the depth image of the current assembly to a depth image point cloud, hereinafter referred to as the assembly point cloud, using the intrinsic and imaging model of the image acquisition device;
  inputting the assembly point cloud to a PointNet++ point cloud feature extraction network to extract point cloud features of the assembly;
  inputting the point cloud features of the assembly to a pre-trained Dense Fusion pose estimation network, outputting position pose information of the assembly in the image acquisition device coordinate system.

In the present embodiment, the assembly three-dimensional model is matched to the depth image, extracts point cloud features using the PointNet++ network, estimates position pose information of the assembly using the pose estimation network Dense Fusion, and enables positioning of the assembly.

As a preferred implementation of this embodiment, the pre-training process of the pose estimation network is:

determining initial information; extracting and recording label position pose information of the three-dimensional model point cloud of the assembly at the initial perspective, the label position pose information comprising a rotation matrix $R_i$ and an offset matrix $T_i$, for each point in the three-dimensional model point cloud, i being an index for each point in the three-dimensional model point cloud;

point cloud conversion; extracting an assembly depth image of the 3D model of the assembly at another view angle different from the initial view angle and converting the assembly depth image into an assembly point cloud using the intrinsic and imaging model of the image acquisition device;

pose prediction; inputting the assembly point cloud to a PointNet++ point cloud feature extraction network, extracting geometric features of the assembly point cloud, generating dense point cloud point-wise features, inputting the point cloud point-wise features to a Dense Fusion pose estimation network, predicting pose prediction information for each point comprising a predicted rotation matrix $R'_i$ and a predicted offset matrix $T'_i$;

calculating a Euclidean distance of the pose prediction information of each point from the label position pose information, generating confidence based on the Euclidean distance; performing the step of the image update if the confidence is less than a set threshold and outputting assembly optimal pose prediction information for the current view angle if the confidence is greater than the set threshold or the number of trains reaches a set value; determining whether training is complete, returning to the step of the point cloud conversion if not complete, continuing training by replacing the assembly depth image at the next view angle, and performing the step of the image update if complete;

an image update; performing displacement and rotation transformations on the assembly point cloud, using the predicted rotation matrix $R'_i$ and the predicted offset matrix $T'_i$ as inputs, updating the three-dimensional coordinates of the assembly point cloud, and inputting the updated assembly point cloud to the PointNet++ point cloud feature extraction network to continue training.

Figure 2:
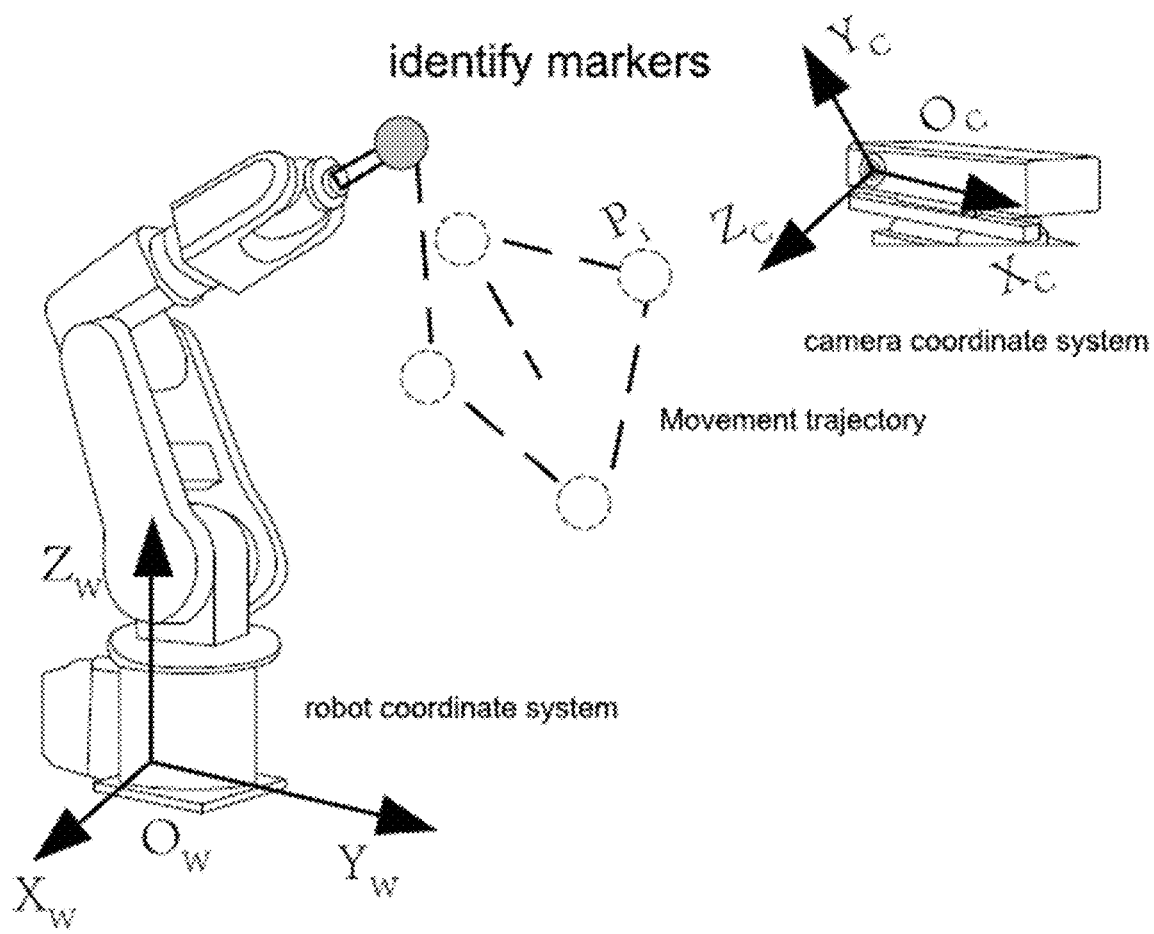
FIG. 2 is a schematic illustration of controlling a robot to perform point-position intermittent movement in accordance with an embodiment of the invention.

Referring to FIG. 2, as a preferred implementation of this embodiment, the image acquisition device is an RGB-D camera, the captured images further includes RGB images; the step of the determining a coordinate transformation relationship between the robot coordinate system and the image acquisition device coordinate system is specified by:

disposing a positioning marker (e.g. Pellets of special shape and color) at a joint of the robot;

controlling the robot to make point-position intermittent motions, at each point of intermittent motion, reading coordinates $P_i(x_{wi}, y_{wi}, z_{wi})$ of the positioning marker in the robot coordinate system $(O_w\text{-}X_wY_wZ_w)$ by the robot controller while identifying pixel coordinates $Z_i(u_i, v_i)$ of the feature point of the positioning marker in the RGB image;

deriving three-dimensional coordinates $P'_i(x_{ci}, y_{ci}, z_{ci})$ of the positioning marker's feature point in the camera coordinate system $(O_c\text{-}X_cY_cZ_c)$ using the positional relationship between the depth camera and the color camera in the RGB-D camera based on the pixel coordinates $Z_i(u_i, v_i)$ of the positioning marker's feature point in the RGB image and the imaging model of the RGB-D camera;

obtaining the coordinates $P_i(x_{wi}, y_{wi}, z_{wi})$ of the positioning marker in the robot coordinate system and the three-dimensional coordinates $P'_i(x_{ci}, y_{ci}, z_{ci})$ of the feature points of the positioning marker in the camera coordinate system of the four or more intermittent motion points, and calculating the transformation matrices of the robot coordinate system and the camera coordinate system, which can be expressed as:

$$\begin{bmatrix} x_{ci} \\ y_{ci} \\ z_{ci} \\ 1 \end{bmatrix} = M_{wc} * \begin{bmatrix} x_{wi} \\ y_{wi} \\ z_{wi} \\ 1 \end{bmatrix}; M_{wc} = \begin{bmatrix} R & T \\ \vec{0} & 1 \end{bmatrix};$$

where R is a 3*3 rotation matrix and T is a 3*1 translation vector, representing the direction and position of the robot coordinate system in the camera coordinate system.

As a preferred implementation of this embodiment, in the step of the controlling the robot to perform the point-position intermittent movement, in order to improve the positioning accuracy, the trajectory of the point-position intermittent movement may be set to be a plurality of squares, $M_{wc}$ is solved by constructing and solving a least squares problem as shown in the following equation:

$$M_{wc} = \underset{R,t}{\operatorname{argmin}} \sum\nolimits_{i=1}^{n} \left\| (RP'_i + T) - P_i \right\|^2;$$

After $M_{wc}$ is solved, the transformation relationship between the color camera coordinate system $O_c\text{-}X_cY_cZ_c$ and the base coordinate system $O_w\text{-}X_wY_wZ_w$ of the robot is obtained, the robot position calibration is completed and the position pose information of the 3D model of the robot is obtained.

Another aspect of the invention provides a digital twin modeling system of assembling a robotic teleoperation environment, including:

an image acquisition device, for capturing images of a teleoperational environment;

an assembly digitization module, pre-loaded with the three-dimensional mold of the parts in the assembly, the constraining relationships between the parts, and the assembly assembling order;

an assembly reconstruction module, for identifying the part currently being assembled in the image and query the assembly assembling order to obtain a list of assembled parts based on the part currently being assembled; and generating a three-dimensional model of the current assembly from the list of assembled parts;

an assembly positioning module, for calculating position pose information of a current assembly in an image acquisition device coordinate system;

a robot digitization module, preloaded with a three-dimensional model of the robot;

a robot positioning module, for determining a coordinate transformation relationship between a robot coordinate system and an image acquisition device coordinate system; and position calibrating the robot in the image according to the coordinate transformation relationship, determining position pose information of the robot in the image acquisition device coordinate system;

a digital twin model reconstruction module, for determining a relative positional relationship between the current assembly and the robot from position pose information of the current assembly in an image acquisition device coordinate system and position pose information of the robot in the image acquisition device coordinate system; and establishing a digital twin model of the teleoperation environment based on the three-dimensional model of the current assembly, the three-dimensional model of the robot, and a relative positional relationship between the current assembly and the robot.

As a preferred embodiment, the image acquisition device is an RGB-D camera.

The yet another aspect of the present invention provides an electronic device, including a memory, a processor, and a computer program stored in the memory and executable in the processor, characterized by the processor when executing the program to implement the digital twin modeling method of assembling a robot teleoperation environment as described in any of the embodiments of the present invention.

The foregoing is merely exemplary embodiments of the present invention and is therefore not intended to limit the scope of the present invention, but rather equivalent structures or equivalent processes described in connection with the present description and the accompanying drawings, either directly or indirectly in other relevant fields of technology, are intended to be encompassed within the scope of the present invention.

The invention claimed is:

1. A digital twin modeling method of assembling a robotic teleoperation environment, comprising the steps of:
    capturing, by an image acquisition device, an image of a teleoperation environment;
    identifying a part currently being assembled in the image;
    querying the assembly assembling order to obtain a list of assembled parts according to the part currently being assembled;
    generating a three-dimensional model of the current assembly from the list of assembled parts and calculating position pose information of the current assembly in an image acquisition device coordinate system;
    loading a three-dimensional model of the robot, determining a coordinate transformation relationship between a robot coordinate system and an image acquisition device coordinate system;
    position calibrating the robot in the image according to the coordinate transformation relationship, and determining position pose information of the robot in an image acquisition device coordinate frame;
    determining a relative positional relationship between the current assembly and the robot from the position pose information of the current assembly in the image acquisition device coordinate system and the position pose information of the robot in the image acquisition device coordinate system;
    establishing a digital twin model of the teleoperation environment based on a three-dimensional model of the current assembly, a three-dimensional model of the robot, and a relative positional relationship between the current assembly and the robot.

2. The digital twin modeling method of assembling a robotic teleoperation environment according to claim 1, wherein the images captured by the image acquisition device include depth images, the step of the identifying parts currently being assembled in the images is specified by:
    identifying regions of different parts of the assembly in the depth image using different color labels to generate an instance segmented image;
    counting color labels of the example segmented images to identify the parts that are currently being assembled.

3. The digital twin modeling method of assembling a robotic teleoperational environment according to claim 2, wherein the step of the generating a three-dimensional model of the current assembly from the list of assembled parts is specified by:
    loading a three-dimensional model of each part in the list of assembled parts;
    determining positions of the parts on the assembly in the list according to predefined constraint relationships between the parts of the assembly;
    generating the three-dimensional model of the current assembly by adjusting the position of the three-dimensional model of each part according to the position of each part in the assembly in the list.

4. The digital twin modeling method of assembling a robotic teleoperation environment according to claim 2, wherein the step of the calculating position pose information of the current assembly in an image acquisition device coordinate system is specified by:
    pre-processing the depth image, removing background, preserving the depth image of the current assembly;
    converting the depth image of the current assembly to an assembly point cloud with the intrinsic and imaging model of the image acquisition device;
    inputting the assembly point cloud to a point cloud feature extraction network to extract point cloud features of the assembly;
    inputting the point cloud features of the assembly to a pre-trained pose estimation network, outputting position pose information of the assembly in the image acquisition device coordinate system.

5. The digital twin modeling method of assembling a robotic teleoperation environment according to claim 4, wherein the pre-training of the pose estimation network is:
    determining initial information; extracting and recording label position pose information of the three-dimensional model point cloud of the assembly at the initial perspective, the label position pose information comprising a rotation matrix $R_i$ and an offset matrix $T_i$, for each point in the three-dimensional model point cloud, i being an index for each point in the three-dimensional model point cloud;
    point cloud conversion; extracting an assembly depth image of the 3D model of the assembly at another view angle different from the initial view angle and converting the assembly depth image into an assembly point cloud using the intrinsic and imaging model of the image acquisition device;
    pose prediction; inputting the assembly point cloud to a point cloud feature extraction network, outputting point cloud point-wise features, inputting the point cloud point-wise features to a pose estimation network, predicting pose prediction information for each point comprising a predicted rotation matrix $R'_i$ and a predicted offset matrix $T'_i$;
    calculating a Euclidean distance of the pose prediction information of each point from the label position pose information, generating confidence based on the Euclidean distance; performing a step of the image update if the confidence is less than a set threshold and outputting assembly optimal pose prediction information for the current view angle if the confidence is greater than the set threshold or the number of trains reaches a set value; determining whether training is complete, returning to the step of the point cloud conversion if not complete, continuing training by replacing the assembly depth image at the next view angle, and performing the step of the image update if complete;

an image update; performing displacement and rotation transformations on the assembly point cloud, using the predicted rotation matrix $R'_i$ and the predicted offset matrix $T'_i$ as inputs, updating the three-dimensional coordinates of the assembly point cloud, and inputting the updated assembly point cloud to the point cloud feature extraction network to continue training.

6. The digital twin modeling method of assembling a robotic teleoperation environment according to claim 2, wherein the image acquisition device is an RGB-D camera, the captured images further includes RGB images; the step of the determining a coordinate transformation relationship between the robot coordinate system and the image acquisition device coordinate system is specified by:

disposing a positioning marker at a joint of the robot;

controlling the robot to make point-position intermittent motions, at each point of intermittent motion, reading coordinates $P_i(x_{wi}, y_{wi}, z_{wi})$ of the positioning marker in the robot coordinate system by the robot controller while identifying pixel coordinates $Z_i(u_i, v_i)$ of the feature point of the positioning marker in the RGB image;

deriving three-dimensional coordinates $P'_i(x_{ci}, y_{ci}, z_{ci})$ of the positioning marker's feature point in the camera coordinate system using the positional relationship between the depth camera and the color camera in the RGB-D camera based on the pixel coordinates $Z_i(u_i, v_i)$ of the positioning marker's feature point in the RGB image and the imaging model of the RGB-D camera;

obtaining the coordinates $P_i(x_{wi}, y_{wi}, z_{wi})$ of the positioning marker in the robot coordinate system and the three-dimensional coordinates $P'_i(x_{ci}, y_{ci}, z_{ci})$ of the feature points of the positioning marker in the camera coordinate system of the four or more intermittent motion points, and calculating the transformation matrices of the robot coordinate system and the camera coordinate system.

7. The digital twin modeling method of assembling a robotic teleoperation environment according to claim 6, wherein in the step of controlling the robot to make the point-position intermittent motion, a trajectory of the set point-position intermittent motion is a plurality of squares.

8. The digital twin modeling system of assembly a robotic teleoperation environment, comprising:

an image acquisition device, for capturing images of a teleoperational environment;

an assembly digitization module, pre-loaded with the three-dimensional mold of the parts in the assembly, the constraining relationships between the parts, and the assembly assembling order;

an assembly reconstruction module, for identifying the part currently being assembled in the image and query the assembly assembling order to obtain a list of assembled parts based on the part currently being assembled; and generating a three-dimensional model of the current assembly from the list of assembled parts;

an assembly positioning module, for calculating position pose information of a current assembly in an image acquisition device coordinate system;

a robot digitization module, preloaded with a three-dimensional model of the robot;

a robot positioning module, for determining a coordinate transformation relationship between a robot coordinate system and an image acquisition device coordinate system; and position calibrating the robot in the image according to the coordinate transformation relationship, determining position pose information of the robot in the image acquisition device coordinate system;

a digital twin model reconstruction module, for determining a relative positional relationship between the current assembly and the robot from position pose information of the current assembly in an image acquisition device coordinate system and position pose information of the robot in the image acquisition device coordinate system; and establishing a digital twin model of the teleoperation environment based on the three-dimensional model of the current assembly, the three-dimensional model of the robot, and a relative positional relationship between the current assembly and the robot.

9. The digital twin modeling system of assembling a robotic teleoperation environment of claim 8, wherein the image acquisition device is an RGB-D camera.

10. An electronic device, including a memory, a processor, and a computer program stored in the memory and executable in the processor, wherein the processor executes the program to implement the digital twin modeling method of assembling a robot teleoperation environment of claim 1.

\* \* \* \* \*